(12) United States Patent
Bevirt et al.

(10) Patent No.: US 10,021,286 B2
(45) Date of Patent: Jul. 10, 2018

(54) POSITIONING APPARATUS FOR PHOTOGRAPHIC AND VIDEO IMAGING AND RECORDING AND SYSTEM UTILIZING THE SAME

(71) Applicant: GoPro, Inc., San Mateo, CA (US)

(72) Inventors: JoeBen Bevirt, Santa Cruz, CA (US); Josh Guyot, Deer Isle, ME (US)

(73) Assignee: GoPro, Inc., San Mateo, CA (US)

( * ) Notice: Subject to any disclaimer, the term of this patent is extended or adjusted under 35 U.S.C. 154(b) by 52 days.

(21) Appl. No.: 15/217,185

(22) Filed: Jul. 22, 2016

(65) Prior Publication Data

US 2016/0330363 A1 Nov. 10, 2016

Related U.S. Application Data

(63) Continuation of application No. 13/676,128, filed on Nov. 14, 2012, now Pat. No. 9,441,781.

(60) Provisional application No. 61/665,872, filed on Jun. 28, 2012, provisional application No. 61/620,360, filed on Apr. 4, 2012, provisional application No.
(Continued)

(51) Int. Cl.
| | |
|---|---|
| *H04N 5/232* | (2006.01) |
| *F16M 11/12* | (2006.01) |
| *F16M 11/18* | (2006.01) |
| *F16M 13/00* | (2006.01) |
| *H04B 1/38* | (2015.01) |
| *G03B 17/56* | (2006.01) |
| *H04B 1/3877* | (2015.01) |

(52) U.S. Cl.
CPC ......... *H04N 5/23203* (2013.01); *F16M 11/12* (2013.01); *F16M 11/18* (2013.01); *F16M 13/00* (2013.01); *G03B 17/561* (2013.01); *H04B 1/3877* (2013.01); *H04N 5/23216* (2013.01); *H04N 5/23293* (2013.01); *H04N 5/23296* (2013.01); *F16M 2200/041* (2013.01); *G03B 17/566* (2013.01); *G03B 2206/00* (2013.01)

(58) Field of Classification Search
None
See application file for complete search history.

(56) References Cited

U.S. PATENT DOCUMENTS

| | | |
|---|---|---|
| 4,989,466 A | 2/1991 | Goodman |
| 5,550,754 A | 8/1996 | McNelley |
| 5,768,648 A | 6/1998 | Skipp |
| (Continued) | | |

FOREIGN PATENT DOCUMENTS

| | | |
|---|---|---|
| WO | 2010036780 A1 | 4/2010 |
| WO | 2011127201 A1 | 10/2011 |

*Primary Examiner* — Timothy J Henn
(74) *Attorney, Agent, or Firm* — Young Basile Hanlon & MacFarlane, P.C.

(57) ABSTRACT

A method and device are provided for positioning a mounted camera. The device includes a holding element that secures the mounted camera to the device, a wireless linkage at which remote attitude commands representing attitude changes of a remote driver are received, a local controller that interprets the remote attitude commands and generates local attitude commands that move the camera to mimic an orientation of the remote driver, and an attitude sensing element that senses a local attitude of the device. The attitude sensing element includes a gyro, an accelerometer, or a magnetometer, and jitter present in the remote attitude commands is removed and not passed on to the local attitude commands.

25 Claims, 17 Drawing Sheets

Related U.S. Application Data

61/600,585, filed on Feb. 18, 2012, provisional application No. 61/559,151, filed on Nov. 14, 2011.

(56) References Cited

U.S. PATENT DOCUMENTS

| | | |
|---|---|---|
| 6,354,750 B1 | 3/2002 | Romanoff |
| 6,428,470 B1 | 8/2002 | Thompson |
| 6,708,943 B2 | 3/2004 | Ursan |
| 6,715,940 B2 | 4/2004 | Top et al. |
| 7,249,317 B1* | 7/2007 | Nakagawa ......... H04N 1/00204 348/211.9 |
| 7,646,417 B2 | 1/2010 | Goto |
| 7,658,557 B2 | 2/2010 | Lu |
| 7,802,802 B2 | 9/2010 | Gordon |
| 8,605,174 B2 | 12/2013 | Namie |
| 2002/0128538 A1 | 9/2002 | Thompson |
| 2003/0048357 A1 | 3/2003 | Kain |
| 2003/0193588 A1 | 10/2003 | Yuen et al. |
| 2004/0100563 A1 | 5/2004 | Sablak |
| 2004/0257441 A1 | 12/2004 | Pevear |
| 2006/0239677 A1 | 10/2006 | Friedrich |
| 2006/0269278 A1 | 11/2006 | Kenoyer |
| 2007/0230946 A1 | 10/2007 | Kimura |
| 2007/0251408 A1 | 11/2007 | Fletcher |
| 2008/0012980 A1 | 1/2008 | Yamane et al. |
| 2008/0024594 A1 | 1/2008 | Ritchey |
| 2009/0073388 A1 | 3/2009 | Dumm |
| 2010/0079101 A1 | 4/2010 | Sidman |
| 2011/0158620 A1* | 6/2011 | Kanayama ............... G03B 5/00 396/55 |
| 2011/0228098 A1 | 9/2011 | Lamb |
| 2012/0019664 A1 | 1/2012 | Watanabe |
| 2012/0044350 A1 | 2/2012 | Verfuerth |
| 2012/0062691 A1 | 3/2012 | Fowler |
| 2012/0083314 A1* | 4/2012 | Ng ......................... H04M 1/11 455/557 |
| 2012/0231421 A1 | 9/2012 | Boerjes |
| 2012/0313557 A1 | 12/2012 | Pettey |
| 2013/0033594 A1 | 2/2013 | Smith |
| 2013/0163977 A1 | 6/2013 | Mack |
| 2013/0208128 A1 | 8/2013 | Steffensen |
| 2013/0222685 A1 | 8/2013 | Topliss |
| 2013/0278755 A1 | 10/2013 | Starns |
| 2014/0009561 A1 | 1/2014 | Sutherland |
| 2014/0055618 A1 | 2/2014 | Myers |

* cited by examiner

POSITIONING APPARATUS FOR PHOTOGRAPHIC AND VIDEO IMAGING AND RECORDING AND SYSTEM UTILIZING THE SAME

CROSS-REFERENCE TO RELATED APPLICATIONS

This application is a continuation of U.S. patent application Ser. No. 13/676,128, filed Nov. 14, 2012, which claims the benefit of the following provisional patent applications: U.S. Provisional Patent Application No. 61/559,151, filed Nov. 14, 2011; U.S. Provisional Patent Application No. 61/600,585, filed Feb. 18, 2012; U.S. Provisional Patent Application No. 61/620,360, filed Apr. 4, 2012; and U.S. Provisional Patent Application No. 61/665,872, filed Jun. 28, 2012, all of which are hereby incorporated by reference in their entireties.

BACKGROUND

Disclosed herein is a tracking system for cameras that includes a mounting apparatus adapted to track a viewed image.

Modern electronic devices, such as tablet computers and smart phones, may be adapted to run software which allows them to control other devices, such as mechanical devices. Also, these devices may also include cameras which allow for photographic or video recording, or transmitting of the images in real time.

SUMMARY

A device is provided for positioning a mounted camera. A holding element secures the mounted camera to the device. The device may have a wireless linkage at which remote attitude commands representing attitude changes of a remote driver are received, a local controller that interprets the remote attitude commands and generates local attitude commands that move the camera to mimic an orientation of the remote driver, and an attitude sensing element that senses a local attitude of the device. The attitude sensing element includes a gyro, an accelerometer, or a magnetometer, and jitter present in the remote attitude commands is removed and is not passed on to the local attitude commands.

A device is also provided for positioning a mounted camera. A holding element secures the mounted camera to the device. The device may also have a wireless linkage at which remote attitude commands representing attitude changes of a remote driver are received. A local controller of the device interprets the remote attitude commands and generates local attitude commands that move the camera to mimic an orientation of the remote driver.

A method is provided for operating a positioning device of a camera that is mounted to the positioning device. The method includes receiving, at a wireless linkage of the positioning device, remote attitude commands representing attitude changes of a remote driver. The method further includes storing the remote attitude commands in a memory device; interpreting, using a processor of a local controller associated with the positioning device, the remote attitude commands; and generating local attitude commands that instruct the positioning device to cause the camera to mimic an orientation of the remote driver. Finally, the method includes moving the camera in accordance with the generated local attitude commands.

DETAILED DESCRIPTION

Figure 1:
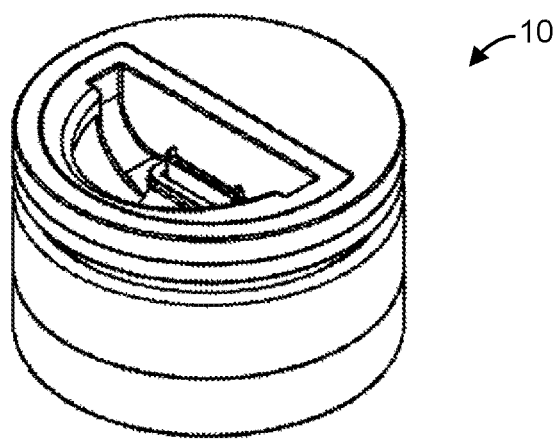
FIG. 1 is a perspective view of a positioning apparatus according to a first embodiment in which a top portion of the apparatus is in a vertical position.
Figure 2:
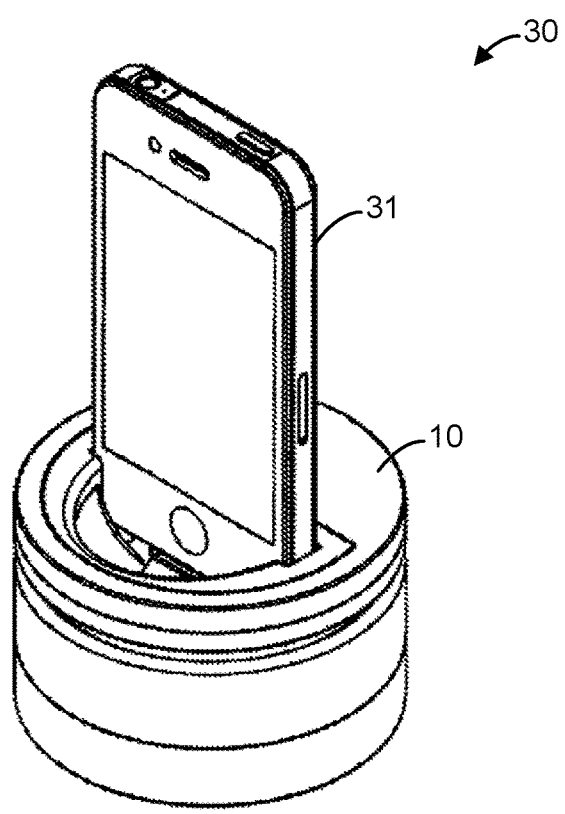
FIG. 2 is a perspective view of a positioning system according to the first embodiment.
Figure 3:
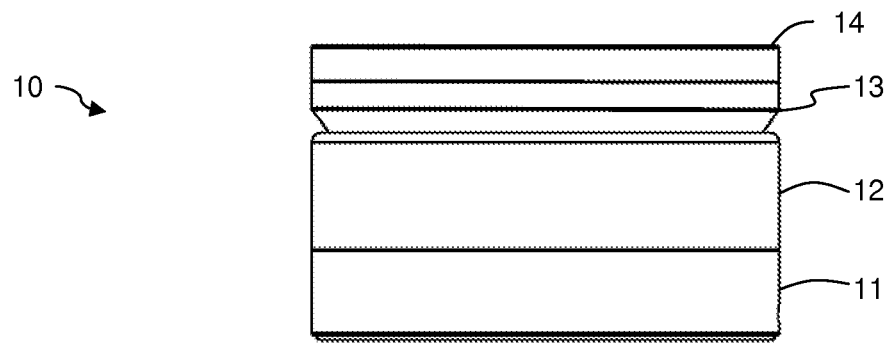
FIG. 3 is a front view of the positioning apparatus according to the first embodiment.
Figure 4:
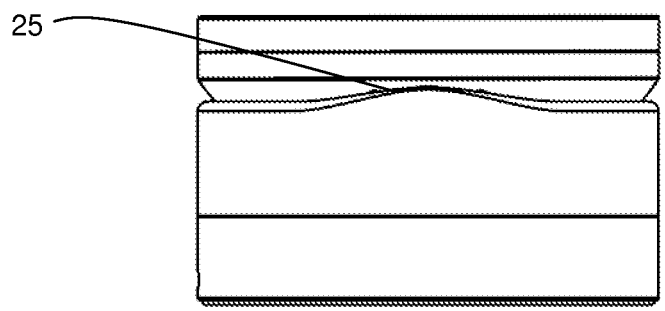
FIG. 4 is a rear view of the positioning apparatus according to the first embodiment.
Figure 5:
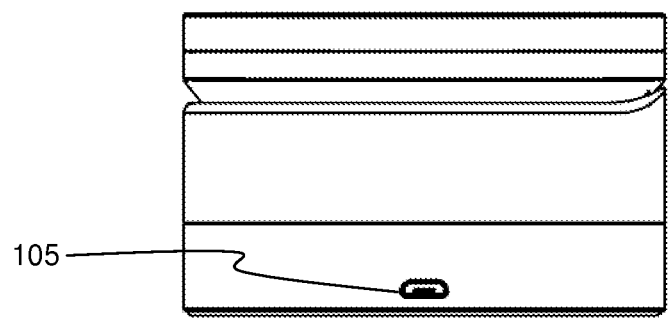
FIG. 5 is a side view of the positioning apparatus according to the first embodiment.

FIG. 1 illustrates a positioning apparatus according to a first embodiment. In this embodiment, the positioning apparatus may be adapted to rotate an electronic device in two axes, while further being able to have an angle between the two rotation axes be set by the user. The positioning apparatus may be adapted to support a smart phone, as seen in the positioning system illustration of FIG. 2.

In the first embodiment, as seen in FIGS. 3-12, a positioning apparatus 10 is adapted to be driven in a plurality of axes by an electronic device mounted thereon. The electronic device may be a smart phone in some embodiments. The electronic device may be a tablet computer in other embodiments. The positioning apparatus may be able to position the device, which may include a camera, such that the camera is able to take pictures while tracking a moving object, for example. In some embodiments, the electronic device/camera is able to send positioning command signals to the positioning device such that the camera is able to take images in a variety of positions. In some embodiments, the electronic device/camera may be able to receive commands at an input port via a cell phone signal or other wireless transmission mode, which then results in the electronic device/camera commanding the positioning apparatus to alter the orientation of the electronic device/camera. In some embodiments, the electronic device/camera may transmit images to a remote device, such as another smart phone, allowing the user of the remote device to observe the images being taken by the first device in real time. The user of the remote device may then be able to command the positioning apparatus, allowing for control and tracking of the positioning apparatus and first device by the second device.

In some embodiments, the positioning device is adapted to receive position commands from the electronic device, which may be a smart phone, and to respond by moving to a commanded orientation. In some embodiments, the positioning device is self-reliant in that it has power, electromechanical drivers, and control electronics (local controller) such that it may move to the commanded orientation based upon simple commands coming from the smart phone. In some embodiments, the smart phone is mounted to the positioning device such that an electrical connector on the smart phone forms part or all of the mounting interface of the smart phone to the positioning device.

In some embodiments, the positioning apparatus 10 has a lower base 11 which is adapted to reside on a fixed object, such as a table top or the ground. The lower rotating unit 12 is adapted to rotate relative to the lower base 11. The lower rotating unit 12 may be movably attached to the lower base 11 such that when the proper commands are sent to the apparatus 10 the lower rotating unit 12 may move as commanded. When the positioning apparatus 10 has been placed on a horizontal surface, the lower rotating unit rotates around a vertical axis. With the rotation of the lower rotating unit 12, the entire apparatus 10, other than the lower base 11, also rotates in conjunction with the lower rotating unit 12.

In some embodiments, such as the first embodiment, a second rotating portion allows for rotation around another axis. In a stowed configuration seen in FIGS. 3-5, the second axis is coaxial to the first, vertical axis of the lower rotating unit. The second rotating portion may have an upper base 13 and an upper rotating unit 14 adapted to rotate relative to the upper base 13. The upper base 13 is rotatably attached to the lower rotating unit at a junction 25 between the two portions. The angle between the upper base 13 and the lower rotating unit 12 may be set by hand by the user. The junction may be of sufficient friction that the pieces may be set at any relative position and retain their configuration. There may be a detent feature at the fully deployed position which enhances the holding force at that position.

Figure 6:
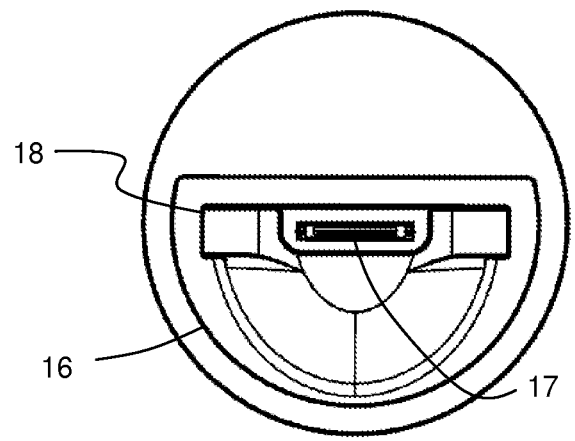
FIG. 6 is a top view of the positioning apparatus according to the first embodiment.

FIG. 6 illustrates the top of the upper rotating unit 14 and its adaptation to receive an electronic device, such as a smart phone. A device well 16 on the top of the upper rotating unit 14 allows for the attachment of the electronic unit to the positioning apparatus 10. A device boot 18 or holding element may be adapted to fit a particular device, or type of device, such that the device boot 18 enhances the attachment of the electronic device to the upper rotating unit 14. In some embodiments, the device boot 18 may be of a rubberized material, or other resilient material, such that the electronic device is well gripped by the device boot 18. The device boot 18 may be removable and replaceable such that a device boot sized to receive a chosen electronic device is used. A device connector 17 may reside within the bottom of the device well 16. The device connector 17 may be a thirty-pin connector in some embodiments. The attachment of the electronic device to the device connector 17 may couple the electronic device to the positioning apparatus both electrically and structurally. The combination of the physical connection of the electronic device to the device connector 17, and the friction of the device boot 18 to the electronic device, may lead to a firm attachment of the electronic device to the positioning apparatus 10, while allowing for easy removal. A port 105 may be adapted to receive electronic input into the positioning apparatus 10. In some embodiments, the port 105 may be a small USB-type port.

Figure 7:
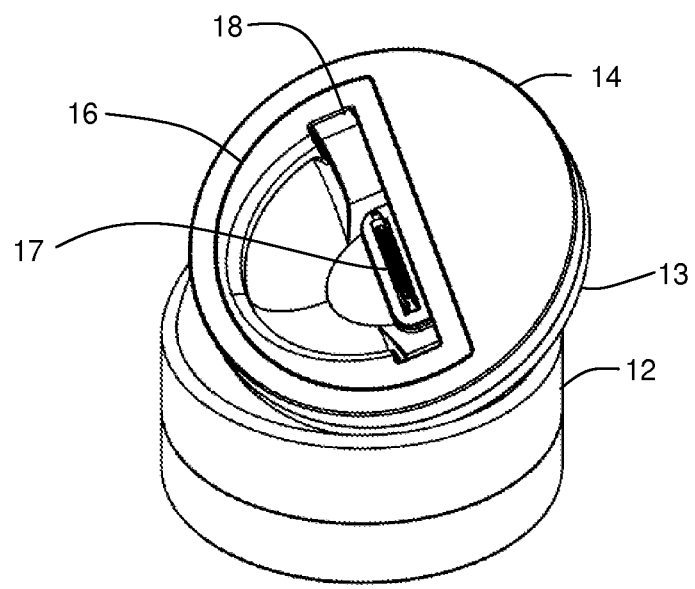
FIG. 7 is a perspective view of the positioning apparatus according to the first embodiment in which the top portion is in a partially rotated position.
Figure 8:
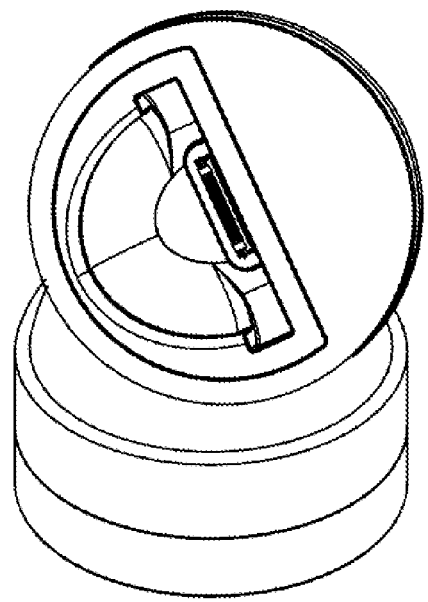
FIG. 8 is a front perspective view of the positioning apparatus according to the first embodiment in which the top portion is in another partially rotated position.
Figure 9:
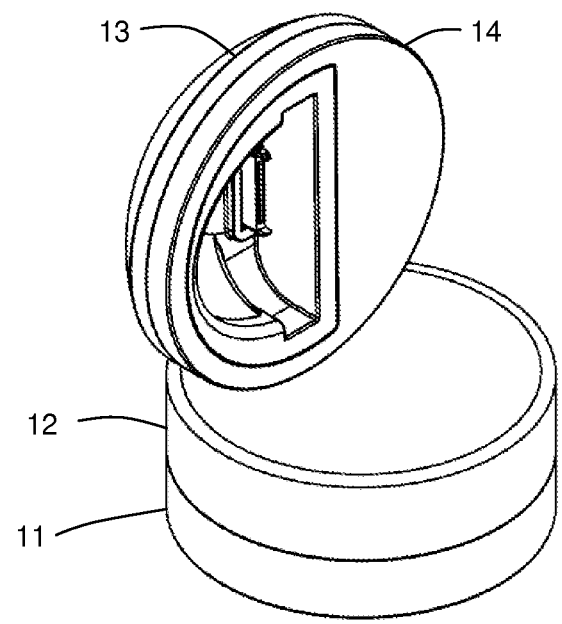
FIG. 9 is a perspective view of the positioning apparatus according to the first embodiment in which the top portion is in a horizontal position.
Figure 10:
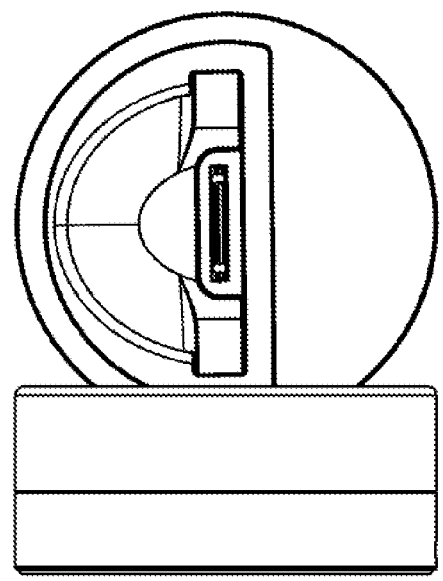
FIG. 10 is a front view of the positioning apparatus according to the first embodiment in which the top portion is in a horizontal position.
Figure 11:
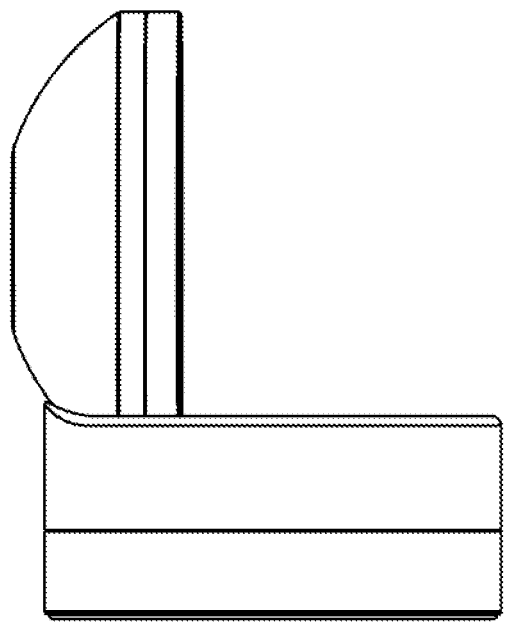
FIG. 11 is a side view of the positioning apparatus according to the first embodiment in which the top portion is in a horizontal position.
Figure 12:
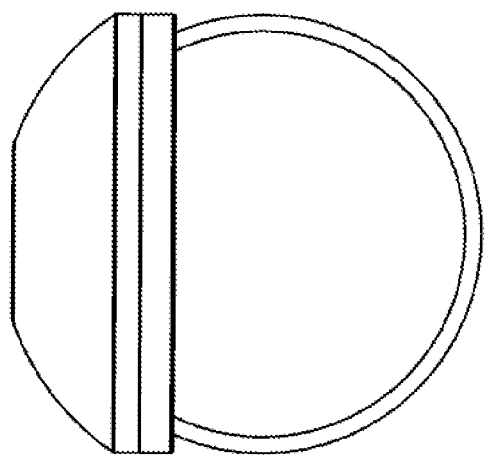
FIG. 12 is a top view of the positioning apparatus according to the first embodiment in which the top portion is in a horizontal position.

FIG. 7 illustrates a configuration wherein the upper rotating unit 14 and the upper base 13 have been set at an angle relative to the lower base 11 and the lower rotating unit 12. In this configuration, the two rotation axes are no longer coaxial. FIG. 8 illustrates a configuration wherein the upper rotating unit has been set to a greater angle than that seen in FIG. 7. FIG. 9 illustrates a configuration wherein the upper rotating unit has been fully deployed. In this aspect, the rotation axis of the upper rotating unit is perpendicular to the rotation axis of the lower rotating unit. In this fully deployed configuration, a camera, such as a camera on a smart phone, would be rotatable in two axes such that various desired views could be achieved.

FIGS. 9-12 illustrate a configuration of the positioning apparatus 10 wherein the rotation axis of the lower rotating unit is vertical, and the rotation of the upper rotating unit is horizontal.

Figure 13:
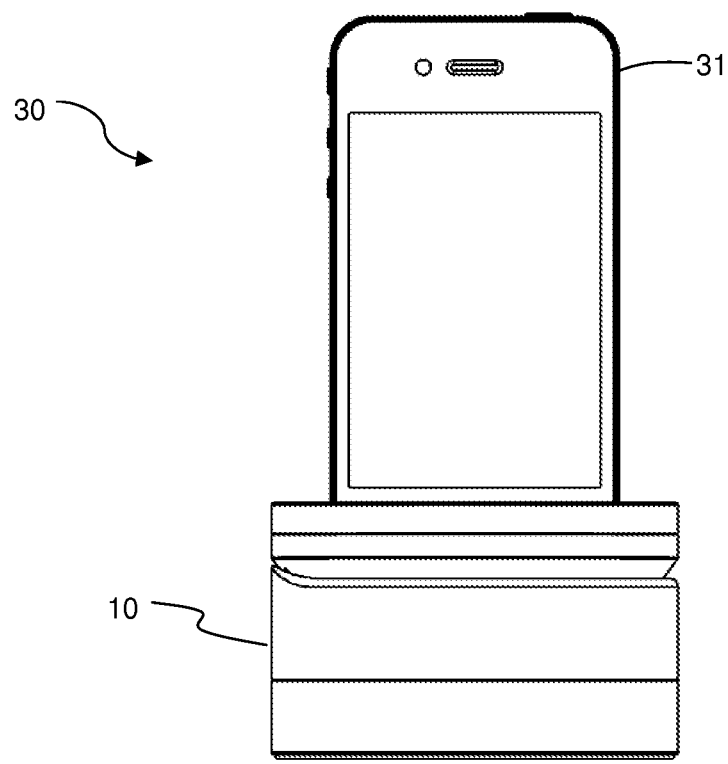
FIG. 13 is a front view of the positioning system according to the first embodiment in which a top portion of the positioning apparatus is in a vertical position.
Figure 14:
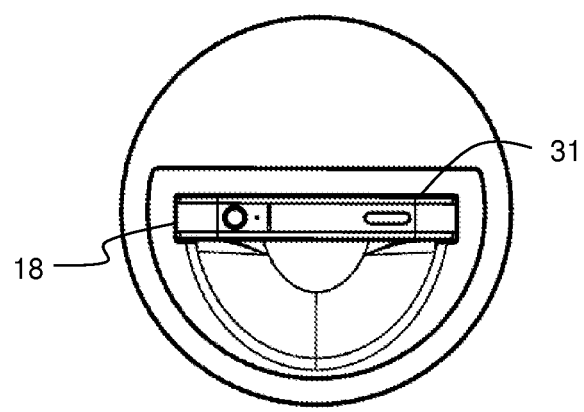
FIG. 14 is a top view of a positioning system according to the first embodiment in which a top portion of the positioning apparatus is in a vertical position.
Figure 15:
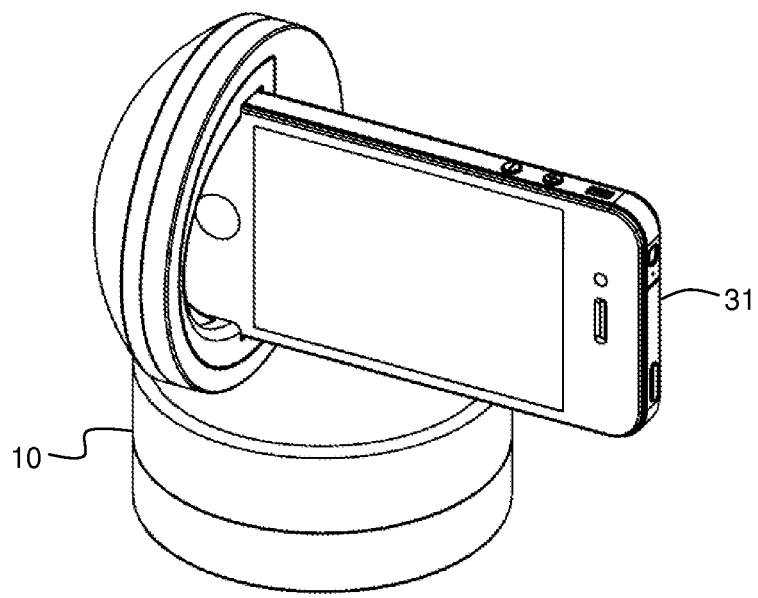
FIG. 15 is a perspective view of a positioning system according to the first embodiment in which a top portion of the positioning apparatus is in a horizontal position.
Figure 16:
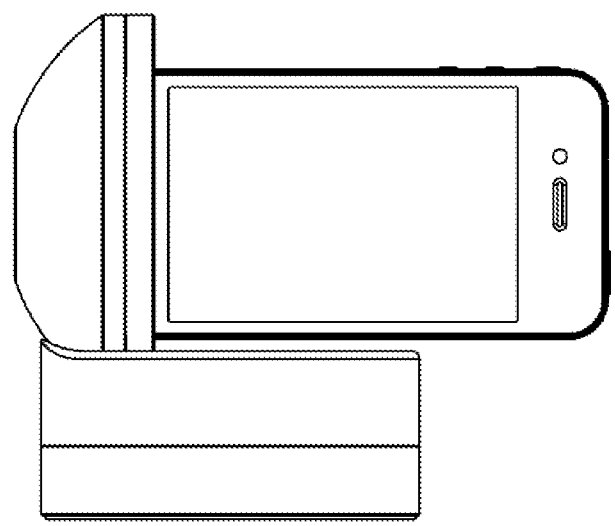
FIG. 16 is a side view of a positioning system according to the first embodiment in which a top portion of the positioning apparatus is in a horizontal position.
Figure 17:
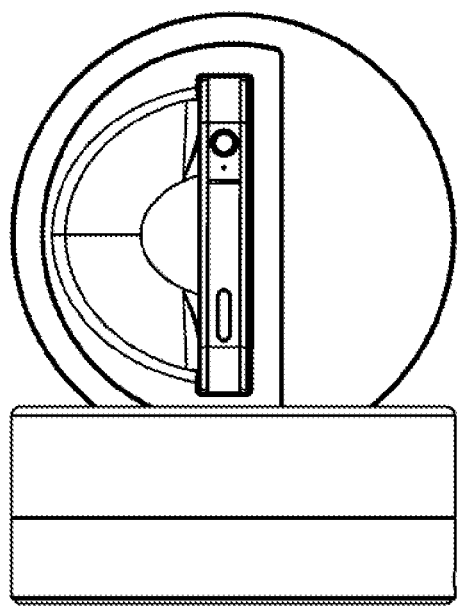
FIG. 17 is a front view of a positioning system according to the first embodiment in which a top portion of the positioning apparatus is in a horizontal position.
Figure 18:
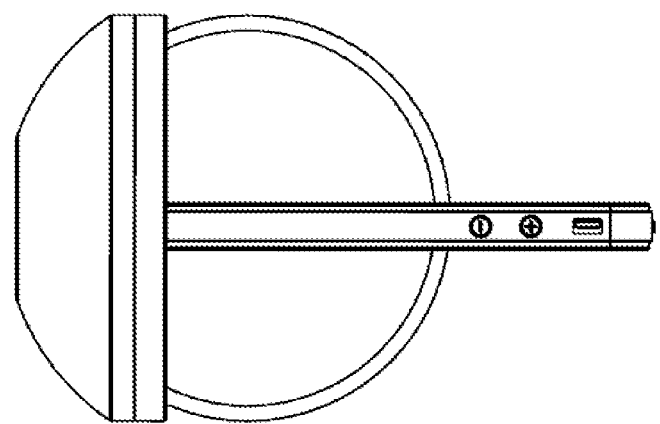
FIG. 18 is a top view of a positioning system according to the first embodiment in which a top portion of the positioning apparatus is in a horizontal position.

FIGS. 13 and 14 illustrate a positioning system 30 with an electronic device 31, which may be a smart phone, mounted in a positioning apparatus 10. The electronic device 31 is seen to fit snugly in the device boot 18. In this configuration, which may be referred to as a stowed configuration, the upper rotating unit has not been rotated around the junction 25. FIGS. 15-18 illustrate a positioning system 30 in a fully deployed configuration, wherein the rotation axis of the upper rotating unit is perpendicular to the rotation axis of the lower rotating unit. In this fully deployed configuration, the camera portion of the electronic device 31 may be rotatable to a variety of orientations with the use of the two rotating units.

In some embodiments, the positioning device has electric motors adapted to drive ring gears mounted within the device. In some embodiments, the base of the device contains a first ring gear driven by an electric motor. A second ring gear is driven by a second motor to provide positioning control in a second axis. The base of the device may contain batteries which provide electrical power for the positioning control of the device. In some embodiments, the batteries may be rechargeable and may be recharged by connecting the base to an electrical power source. In some embodiments, the electrical power may connect via a USB-type connector in the base. In some embodiments, the electrical power supplied to the base may be used to provide power for, or to recharge, the smart phone mounted in the base as well. In some embodiments, the batteries of the smart phone may provide the power for the positioning device.

Figure 19:
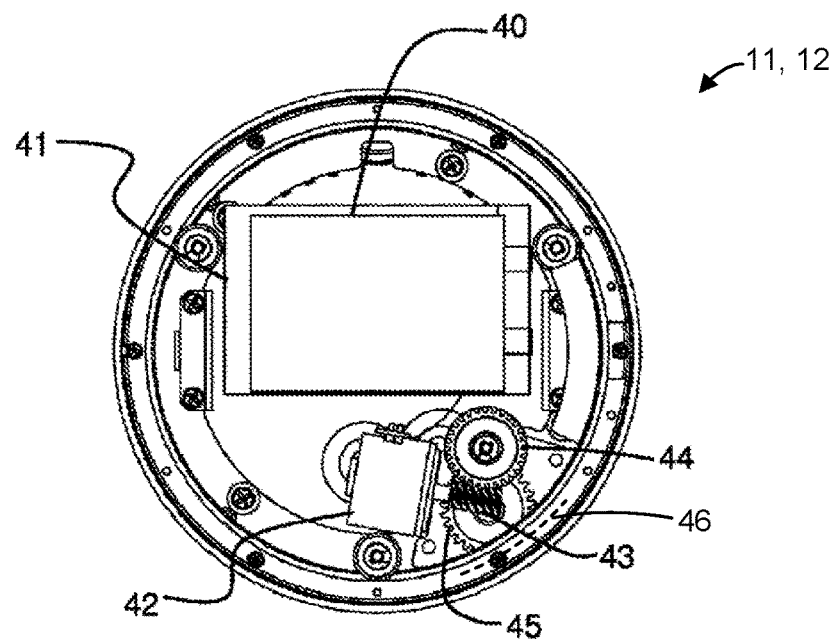
FIG. 19 is top view of an interior of a base unit of the positioning apparatus according to the first embodiment.
Figure 20:
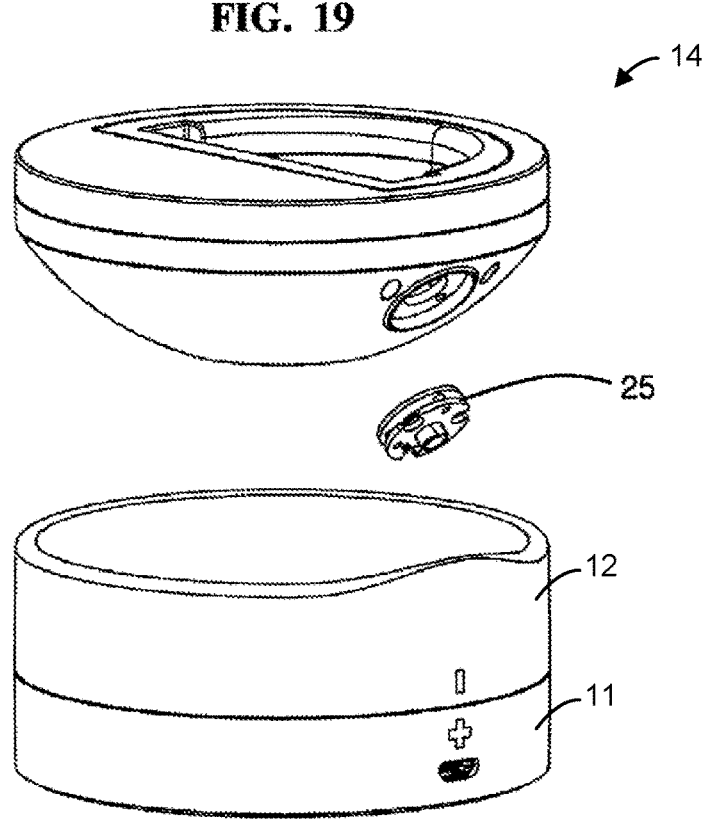
FIG. 20 is an exploded perspective view illustrating relationships between components of a positioning apparatus according to the first embodiment.

FIG. 19 illustrates aspects of the drive portion of the lower rotating unit. In the lower portion of the positioning apparatus 10, a ring gear is mounted within the inner periphery of the lower base 11. The lower rotating unit 12 houses components which allow the lower rotating unit 12 to rotate relative to the lower base 11, which may remain fixed upon a surface. Within the lower rotating unit 12 is a motor 42 with a worm gear 43 affixed to its output shaft. The motor 42 may be a stepper motor in some embodiments. The motor may be an 18-degree stepper, and with the full gearing the output angle of the lower rotating unit relative to the lower base unit may be 0.171 degrees. In addition, the control electronics of the system may be adapted to step the stepper motor at even smaller intervals, such that each 18-degree step may be further broken into thirty-two micro-steps. A gear train 44, 45 leads to an interior ring gear 46 affixed to the lower base. A battery 40 and a lower electronics 41 are adapted to provide step control and power to the motor 42 such that the lower rotating unit 12 rotates relative to the lower base 11. In some aspects, electrical power may be delivered via the port in the lower base 11. A rotary sliding contact assembly between the lower base 11 and the lower rotating unit 12 is adapted to transfer an electrical connection from the port to the lower electronics 41. In some aspects, electrical power may be delivered from the battery 40 up to the upper electronics via wires within the junction 25. In some aspects, electrical power and signals may be delivered down to the lower electronics 41 from the upper portion via wires within the junction 25.

Figure 21:
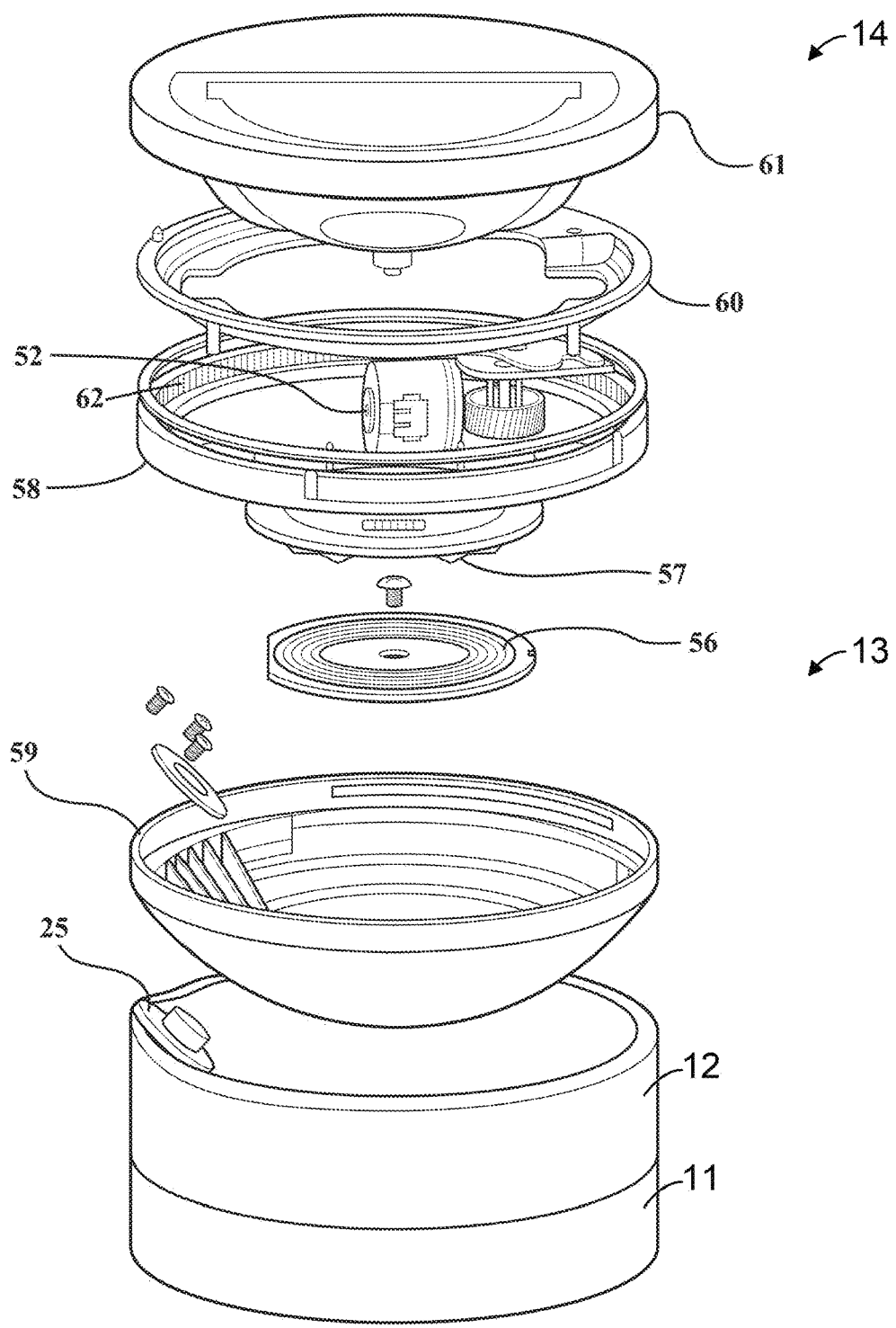
FIG. 21 is another exploded perspective view illustrating relationships between components of a positioning apparatus according to the first embodiment.

FIG. 21 illustrates a partial view of an exploded illustration of the upper rotating portion. A similar drivetrain and electronics as seen in the lower portion is again seen in the upper portion. The upper base is seen to have an upper base shell 59 to which is affixed to an upper base structure 58, with an internal ring gear 62 attached therein. The upper base shell 59 couples to the junction 25. The upper rotating portion has an upper rotating unit structure 60 and an upper rotating portion top 61. An upper motor 52 is adapted to drive the gear train in response to a signal from an upper electronics affixed within the upper rotating portion. A rotating sliding contact assembly 56, 57 allows for transfer of electrical power and signals from the upper rotating unit 14 to the upper base 13.

In some aspects, the sliding contact assemblies allow for the continuous rotation of each of the rotating portions relative to their bases, as may be desired during continuous tracking of an object by a camera. In some aspects, the junction may not be adapted to rotate more than from the stowed to the fully deployed configuration, although this may be done in either direction. Wires may be used to transfer power and signals from the upper base to the lower rotating unit. The rotating portions may house the motor and drive electronics, while the base portions may have ring gears. In this aspect, the motors and drive electronics may drive themselves around the inside of the ring gears.

In some embodiments, a single axis positioner 80 is adapted to rotate an electronic device, such as a tablet computer 84. The positioner 80 may include a recess 81 adapted to receive a tablet computer 84. A base 83 may reside on a surface, and a rotating portion 82 may rotate relative to the base 83. Aspects of the single axis positioner with regard to drive components may be substantially similar to the components described above with regard to other embodiments. The tablet computer 84 may act as a driver for the positioner 80 using a wireless technology, such as Bluetooth.

The multi-axis positioning control allows a camera mounted onto the positioning device to take pictures at multiple orientations around the location at which the positioning device is placed. The positioning device may also be able to be controlled in a dynamic sense, in that the rate of change in position (speed) may also be controlled. This may be useful when the camera is used to track a moving object. In some embodiments, the positioning device contains control electronics which are adapted to position the camera based upon direction and speed inputs for two axes. In some embodiments, three axes may be controlled.

In some embodiments of a system using a positioning device and an electronic device, such as a smart phone, the smart phone may contain instructions for allowing operation of the system according to a variety of operational modes. In some modes, the system may operate according to a preselected paradigm, such as creating a panoramic image. In this case, the camera may move from location to location, taking a still image at each position. In another mode, the camera may rotate around a 360-degree range to make a panoramic video from a single location. In some embodiments, an adaptor may be used to hold a device otherwise not designed to be held in the standard dock.

In some modes, preprogrammed operational paradigms may reside within the memory of the smart phone. The user may select the paradigm using the smart phone itself. In some aspects, the smart phone may be accessible remotely, such as via the Internet. In these aspects, the user may select the operational paradigm remotely.

In some modes, the system may be controllable in real time, such as a remote user using a device, such as a computer or another smart phone, to command the camera/positioning device combination to selected orientations in real time.

Figure 23:
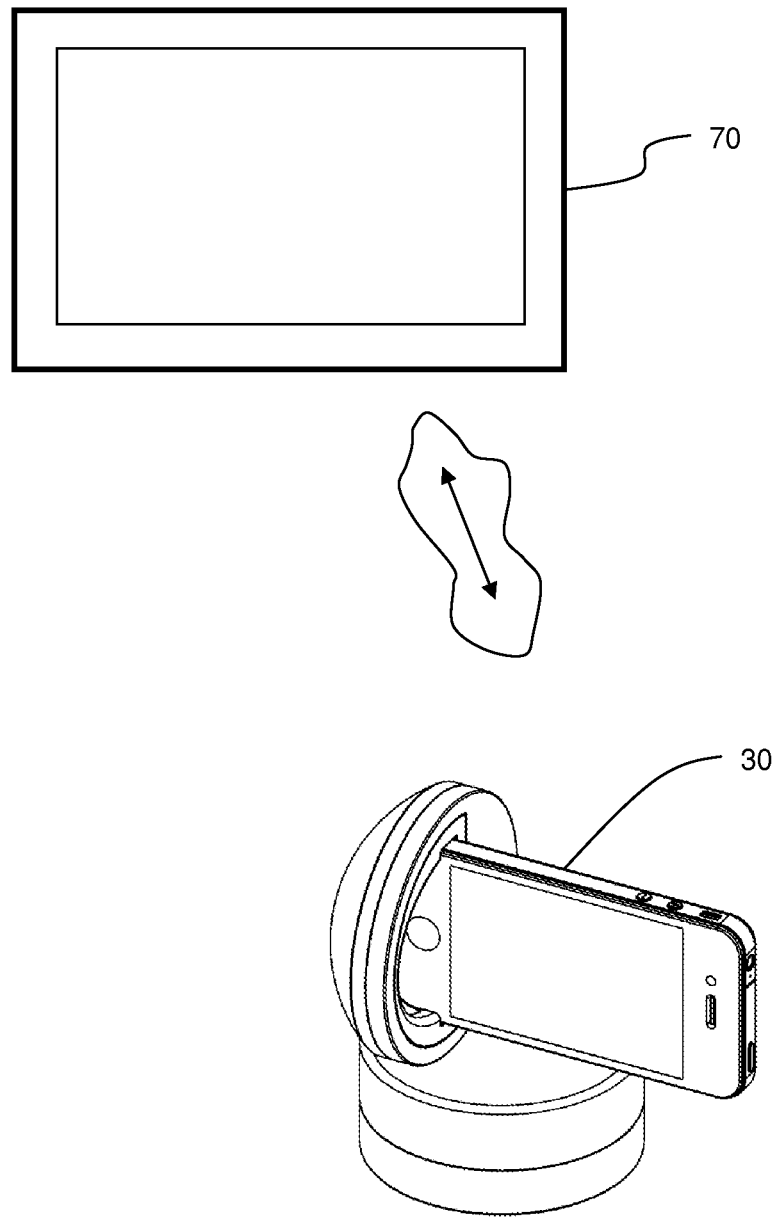
FIG. 23 is a perspective view illustrating a positioning system utilizing a driver to communicate with another device according to the first embodiment.
Figure 24:
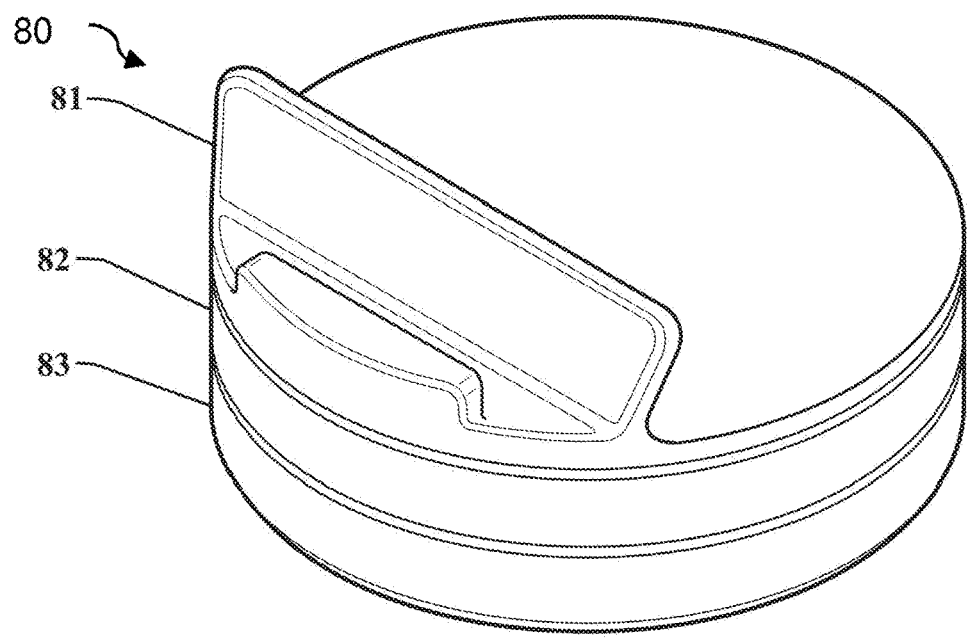
FIG. 24 is a perspective view of a positioning apparatus according to a second embodiment.
Figure 25:
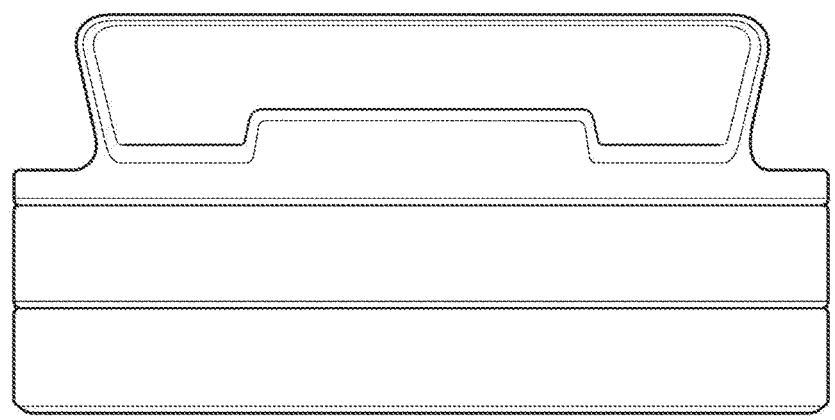
FIG. 25 is a front view of a positioning apparatus according to the second embodiment.
Figure 26:
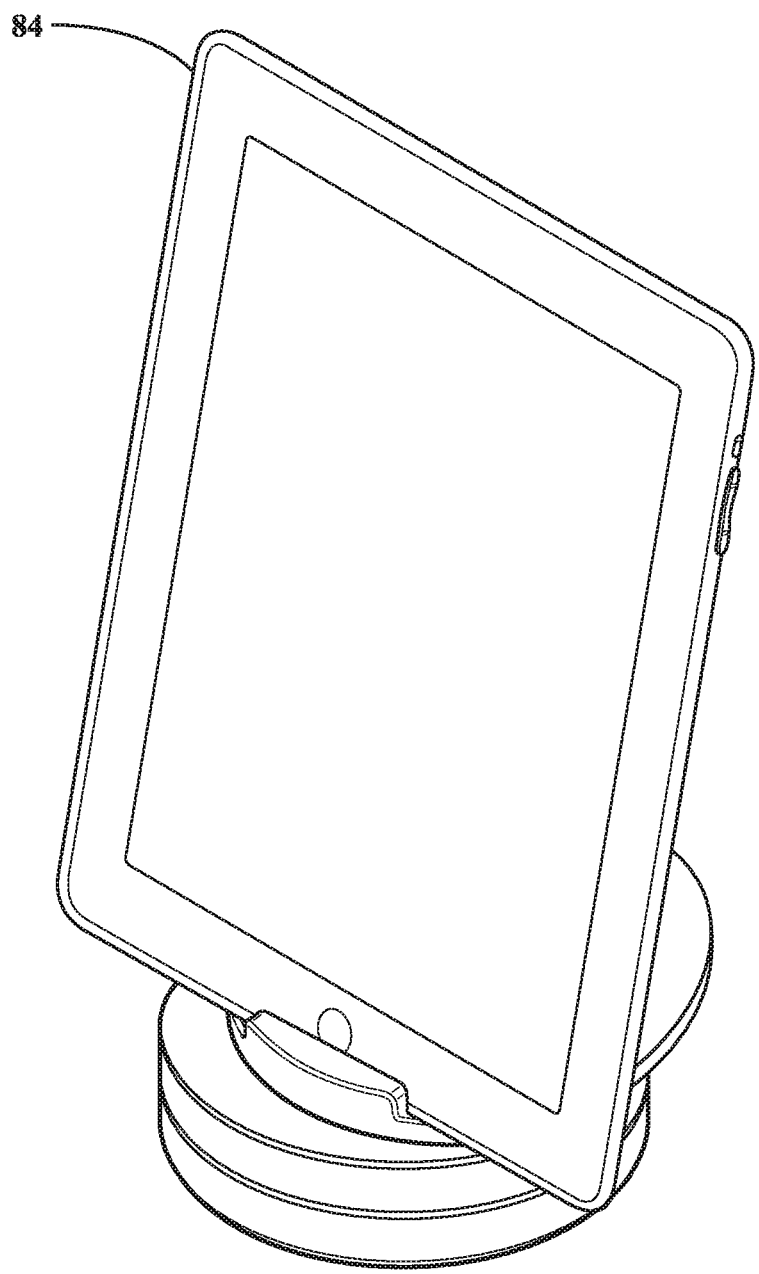
FIG. 26 is a perspective view of a positioning system according to the second embodiment.
Figure 27:
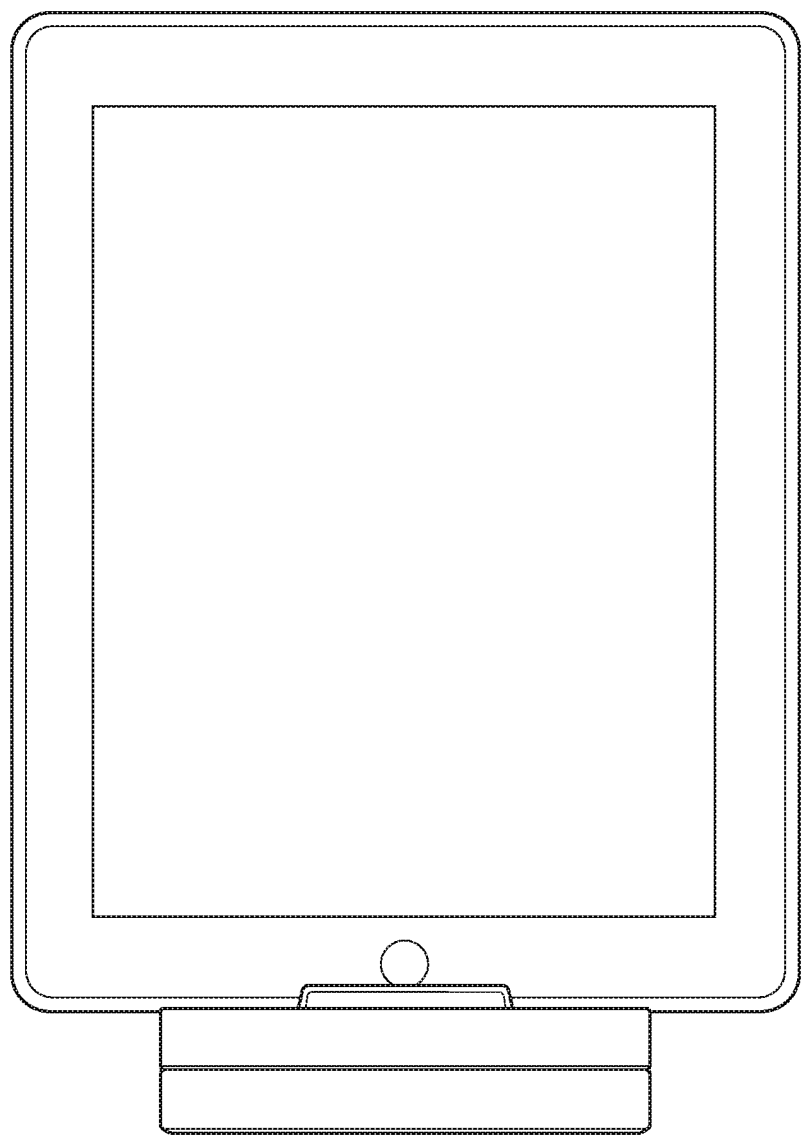
FIG. 27 is a front view of the positioning system according to the second embodiment.
Figure 28:
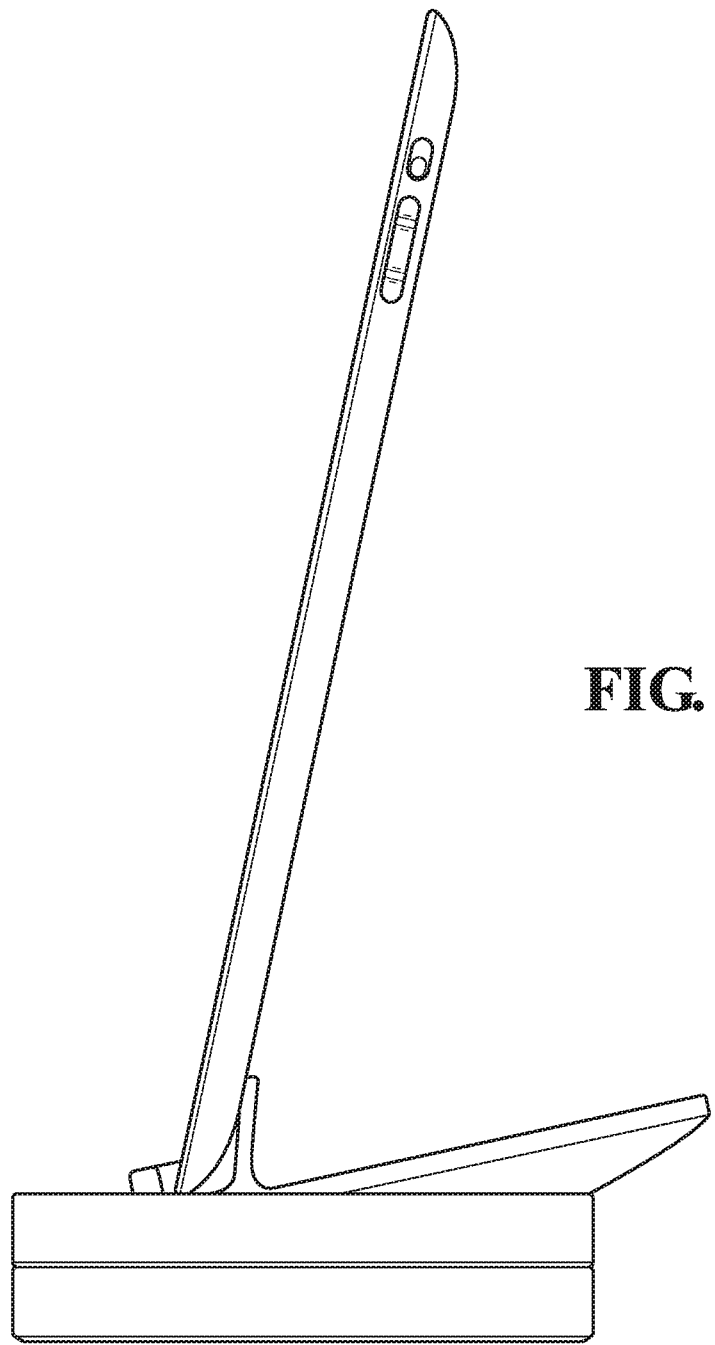
FIG. 28 is a side view of the positioning system according to the second embodiment.

In some embodiments, as seen in FIG. 23, the multi-axis positioning assembly 30, and the camera mounted therein, may be controlled by a remote driver 70. The remote driver may be linked to the positioning mechanism by a Wi-Fi or cellular network, for example. The expanded system using a remote driver may be part of a system that allows for video chat, or of active tracking by the camera in real time. Examples of this expanded system may utilize a personal computer, or a mobile touch device, for example.

In some embodiments, the remote driver may be a laptop or PC. Control may be exercised through either a web app (e.g., Chrome, Firefox, or IE) or stand-alone program (e.g., Skype, Google Videos, Facebook Video, or Apple FaceTime). Control may also be exercised through mouse gestures or clicks on the video being seen and sent by the positioning base unit. Control may also be exercised via a 3D mouse, track ball, touch pad, eye tracking system, or other input device.

In some embodiments, the remote driver may be a mobile touch device. Control may be by way of swiping a finger across the remote driver screen to move the positioning base unit in the desired direction. Control may also be by using the remote driver accelerometers and gyros to send position commands. The positioning unit may mimic the same orientation as the remote driver. In some embodiments, a pinching gesture may be used to control optical or digital zoom of the camera on the positioning unit.

Any device directly connected to the positioning unit and sending control commands may be referred to as a driver as well. Examples include an iPhone, an iPod Touch, other mobile devices, or a PC. A driver may be connected in various ways, such as: (1) Expansion Port 1, (2) USB plugged into the side of the positioning unit, (3) the 30-pin connector in the dock, and (4) Expansion Port 2. A driver may also be used to preprogram movements and other commands into the onboard peripheral interface controller (PIC), and be disconnected from the positioning unit once programming is complete. The program may then be executed after a duration of time, at a set time, or by way of a trigger signal from an expansion port or the USB port. The trigger could also be the rotation of the positioning unit to a set position such as the battery level indicator position. The trigger could also be an IR Remote.

In some embodiments, the system may utilize a positioning unit with an electronic device, such as a smart phone, utilized as a driver, which is coupled to a remote driver, such as another smart phone or a tablet computer, which has sensors such as internal gyros, accelerometers, and/or magnetometers. In some modes, the positioning unit and the smart phone mounted thereon may be positionally commanded by the movement of the remote driver. For example, if a user viewing images taken by the positioned device—which are transmitted to and then viewed on a remote viewing tablet or other viewing device—desires to see to the left of the viewed image (as seen on the tablet screen), the user could rotate the viewing tablet to the left (counterclockwise as viewed from above), resulting in a pan of the positioning unit and its mounted smart phone to the left. In this way, attitude linking of the driver and the positioning unit and imaging smart phone may be achieved.

In an example of such embodiments, a system may comprise a positioning unit with a smart phone residing therein. The smart phone may include an application adapted to couple to a remote driver. The smart phone may also include a camera which may take video images. The remote driver may be a tablet computer which is at a remote location. A user may be using the remote driver to view images taken by the smart phone while the smart phone is in the positioning unit.

An example of the steps involved may be as follows. The system may be started such that the smart phone is mounted onto the positioning unit. The smart phone may have an application running that is adapted to support the system function. The smart phone is coupled to a remote driver, which may be a tablet computer. The user may hold the tablet computer, which displays images taken by the camera within the smart phone. The images may be video images. The tablet computer/remote driver may have one or more internal attitude sensing elements (also defined herein as sensors) such as accelerometers, gyros, and other position, attitude, and acceleration sensors. The user may pan or tilt the tablet computer. The sensors in the tablet computer provide output which includes information on the attitude change of the tablet computer. This information is transmitted to the smart phone in processed or unprocessed form. The transmission of this data may take place over a wireless phone network, over the Internet, over a wireless intranet, or in other ways. The smart phone receives the information related to the change in attitude of the driver in a form of attitude commands. The smart phone, functioning as the driver of the positioning unit, then commands the positioning unit to move the smart phone in concert with the tablet. For example, if the tablet has been rotated clockwise (as viewed from above), the smart phone could then also be rotated clockwise by the positioning unit.

In some embodiments, the driver may determine the rates of rotation of the driver as moved by the user. The driver may then send this information to the smart phone. The smart phone may then command the positioning unit to rotate at the same rate and for the same duration as determined by the driver based upon its sensor input. The user then is able to view images on the tablet that simulate the experience of having turned the remote smart phone and positioning unit assembly. In some embodiments, the positioning unit may be limited to two axes of movement, which may be pan and tilt. In some embodiments, the positioning unit may move the smart phone in three axes.

In some embodiments, the smart phone on the positioning unit may have its own attitude sensors which may provide output that may be used to verify or correlate that the commands given to the positioning unit, based upon the motion of the driver, have been accurately implemented. In some modes, the system may have autonomous tracking modes which allow the images taken by the camera to be analyzed, with data from this analysis being used to provide positioning commands. For example, an object of interest could be selected, and once selected, the camera may track the object of interest.

In some embodiments, the system may be used to implement time-lapse photography or cinematography. With an app on the driver the system may be programmed to run time-lapse sequences or smooth video sequences. The system may be set to go from point A to point B in X amount of time, and then go to further points, and so on. Shot frequency may be set for time-lapse usage. Programming the number of degrees to move, which axis, at what speed for each part of the sequence, may all be done within an app on the driver.

In some embodiments, the application residing on the driver may be adapted to teach positions by moving the pan and tilt axis to the specified position for each step of the sequence, and then either setting the amount of time between positions or the speed to go to each position. The number of frames to shoot may also be set for time-lapse applications. The user may also utilize a remote driver to move the system to each position specified for the sequence. This way the user may easily see exactly what the system will see at each position along the sequence. The user may also use a preprogrammed sequence from a saved list or downloaded from the Internet. Position programming may also be used for multi parallel time lapse, defined as operating the system to cycle between two or more positions and shoot a frame at each position. The result is multiple time-lapse videos created over the same period of time. The app running this could name each frame captured with a location name and image number for that location. Then the images may be sorted and compiled into a video sequence. The app could also use image recognition to precisely align the system with the last frame taken.

In some embodiments, the system may facilitate two-way video conferencing, and may utilize tracking. For example, two users may each have a viewing screen such as a tablet computer or fixed screen. Each user may also have a positioning unit with a device such as a smart phone which is adapted to take video images of the adjacent user during the video call. One or each of the imaging units may be adapted to track the adjacent user during the call.

In some embodiments, the system may be used with motion sensors, or other sensors, that trigger a tracking mode. In some embodiments, the activation of motion sensors may also instigate a call or other action from the smart phone to another number so that a user may know of the triggering by the motion sensor. At that time, the user may be able to control the position of the camera for viewing.

Figure 22:
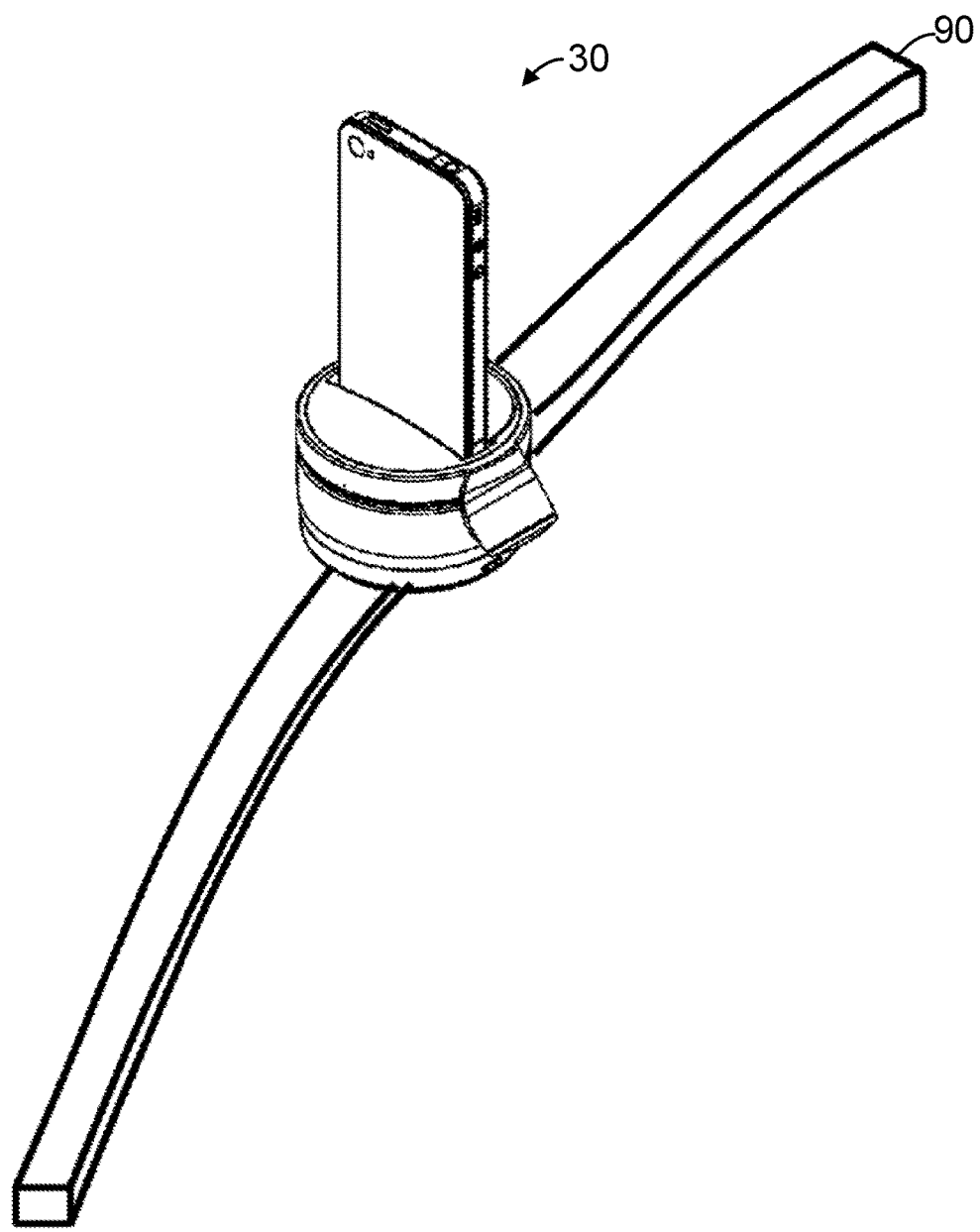
FIG. 22 is a perspective view of a rail system permitting movement of the positioning system according to the first embodiment.

In some embodiments, as seen in FIG. 22, a system uses the positioning mechanism as described in part above along with a further tracking mechanism adapted to move the base unit along a rail 90. The control of the system may utilize commands which move the base unit to different positions as part of preprogrammed paradigms or in a real-time command mode.

In some embodiments, the control of the positioning mechanism may be controlled by a driver over a long distance. In some aspects, the driver may be coupled to the positioning mechanism over the Internet. For example, the driver could be connected to the Internet via a wireless Internet signal. Similarly, the positioning mechanism could be connected to the Internet via a wireless connection to the Internet. In some aspects, the positioning mechanism could be coupled over a long distance to the driver using a cell phone signal, such as over a 3G or 4G network. The long distance connection may provide control of the positioning mechanism from the driver as well as transmission of the video signal back to the driver.

In some embodiments, the control of the positioning mechanism may be done locally. The positioning mechanism, which may include a video camera mounted thereon, may couple to the driver over a wireless router in some aspects. In some aspects, a local hotspot may provide the coupling of the positioning mechanism to the driver.

In some embodiments, the driver may be used to allow for manual tracking of an event from a device mounted upon a positioning unit. For example, a video camera may be mounted on a positioning unit. The video camera may be part of a smart phone which includes capability to run an application. The video camera and positioning unit may be placed upon a solid mounting location, which may allow for imaging with a minimum of jitter. The user may have a handheld device such as another smart phone. The handheld smart phone may be coupled to the positioning unit mounted smart phone such that the handheld smart phone may display the image taken by the positioning unit mounted smart phone. The user may view the image and pan or tilt the handheld unit so that the positioning unit mounted camera tracks according to the desires of the user, which are relayed by rotating the driver. The user may see, in real time, that the positioning unit mounted camera has responded to the movement commands. This system allows the user to control the camera in the positioning unit, which is not subject to the jitter that the handheld unit may be experiencing. The transmission of the image data to the handheld unit, which is done to facilitate this functionality, may be of low quality (low resolution) so that bandwidth is not a limiting factor. However, the image data recorded by the camera in the positioning unit may be of high quality (high resolution), and also not subject to jitter as the handheld unit may be.

In some embodiments, the positioning mechanism with the camera/video camera mounted thereon may be under autonomous control. In such a case, the positioning mechanism/camera system may not be under outside control and instead operates autonomously. Such aspects may include time-lapse photography applications, for example.

As is evident from the above description, a wide variety of embodiments may be configured from the description given herein, and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A device for supporting a camera comprising:
    a positioning apparatus having a first rotational axis and a second rotational axis;
    the camera coupled to the positioning apparatus; and
    a driver coupled to the positioning apparatus,
    wherein the driver and the camera are separately coupled to the positioning apparatus,
    wherein the driver receives a time-lapse sequence comprising:
        positions for orientation of the positioning apparatus about the first rotational axis,
        positions for orientation of the positioning apparatus about the second rotational axis,
        a first time interval over which to move the positioning apparatus about the first rotational axis at a first speed,
        a second time interval over which to move the positioning apparatus about the second rotational axis at a second speed, and
        a frequency of frame capture for the camera to capture image frames between the positions of the positioning apparatus,
    wherein the driver sends commands to move the positioning apparatus about the first rotational axis according to the first time interval and to move the positioning apparatus about the second rotational axis according to the second time interval, and
    wherein the camera captures image frames while the orientation of the positioning apparatus about the first rotational axis and the second rotational axis changes according to the frequency of frame capture.

2. A positioning device for supporting a camera comprising:
    a positioning apparatus having a first rotational axis and a second rotational axis; and
    a driver coupled to the positioning apparatus,
    wherein the driver receives a motion sequence comprising:
        positions for orientation of the positioning apparatus about the first rotational axis,
        positions for orientation of the positioning apparatus about the second rotational axis,
        a first time interval over which to move the positioning apparatus about the first rotational axis, and
        a second time interval over which to move the positioning apparatus about the second rotational axis, wherein the driver sends commands to move the positioning apparatus about the first rotational axis according to the first time interval and to move the positioning apparatus about the second rotational axis according to the second time interval.

3. The device of claim 2,
wherein the driver comprises the camera and is removably coupled to the positioning apparatus,
wherein the positions of the positioning apparatus are received as user inputs to the driver,
wherein the driver displays one or more image frames captured by the camera at each of the positions of the positioning apparatus during input of the positions, and
wherein the motion sequence is a time-lapse sequence and comprises a frequency of frame capture for the camera to capture image frames between the positions of the positioning apparatus.

4. The device of claim 2, wherein the motion sequence is a time-lapse sequence.

5. The device of claim 2, wherein the positioning apparatus is coupled to the camera.

6. The device of claim 5, wherein the positioning apparatus is removably coupled to the camera.

7. The device of claim 2, wherein the positioning apparatus comprises the camera.

8. The device of claim 2, wherein the driver comprises the camera.

9. The device of claim 8, wherein the driver is removably coupled to the positioning apparatus.

10. The device of claim 2, wherein the driver is remotely located from the positioning apparatus and comprises the camera.

11. The device of claim 10, wherein the driver is configured to display image frames captured by the camera.

12. The device of claim 2, wherein the motion sequence comprises a frequency of frame capture for the camera to capture image frames between the positions of the positioning apparatus.

13. The device of claim 12, wherein the positions of the positioning apparatus, the frequency of frame capture, and the first and second time intervals are received as user inputs to the driver.

14. The device of claim 13, wherein the driver displays one or more image frames captured by the camera at each of the positions of the positioning apparatus during input of the positions.

15. A method for operating a device for supporting a camera, the method comprising:
receiving, at a positioning apparatus having a first rotational axis and a second rotational axis, a motion sequence from a driver, the motion sequence comprising:
positions for orientation of the positioning apparatus about the first rotational axis,
positions for orientation of the positioning apparatus about the second rotational axis,
a first time interval over which to move the positioning apparatus about the first rotational axis, and
a second time interval over which to move the positioning apparatus about the second rotational axis; and
based on a command from the driver, moving the positioning apparatus about the first rotational axis according to the first time interval and moving the positioning apparatus about the second rotational axis according to the second time interval.

16. The method of claim 15, wherein the positions of the positioning apparatus and the first and second time intervals are received as user inputs to the driver.

17. The method of claim 15, wherein the camera is removably coupled to the positioning apparatus.

18. The method of claim 15, wherein the driver displays one or more frames captured by the camera at each of the positions of the positioning apparatus during input of the positions of the motion sequence at the driver.

19. The method of claim 15, wherein the motion sequence includes a frequency of frame capture by the camera between the positions of the positioning apparatus.

20. The method of claim 15, wherein the motion sequence comprises positions for orientation of the first rotational axis and positions for orientation of the second rotational axis.

21. The method of claim 20, wherein the motion sequence comprises movement of the first rotational axis between the positions of the first rotational axis and movement of the second rotational axis between the positions of the second rotational axis.

22. The method of claim 15, wherein the positioning apparatus comprises an output port via which the positions of the positioning apparatus are transmitted to the driver.

23. The method of claim 15, wherein the positioning apparatus comprises an input port that is a wireless signal port via which the positioning apparatus or the camera receives commands from the driver.

24. The method of claim 15, further comprising:
sensing the positions of the positioning apparatus using an attitude sensing element, wherein the attitude sensing element includes a gyro, an accelerometer, or a magnetometer.

25. The method of claim 15, wherein the motion sequence is a time-lapse sequence.

* * * * *